US008963467B2

(12) United States Patent
Ko

(10) Patent No.: US 8,963,467 B2
(45) Date of Patent: Feb. 24, 2015

(54) MOTOR DRIVING DEVICE AND METHOD OF CONTROLLING THE SAME

(71) Applicant: Samsung Electro-Mechanics Co., Ltd., Gyunggi-do (KR)

(72) Inventor: Joo Yul Ko, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 166 days.

(21) Appl. No.: 13/678,091

(22) Filed: Nov. 15, 2012

(65) Prior Publication Data

US 2014/0062374 A1    Mar. 6, 2014

(30) Foreign Application Priority Data

Sep. 5, 2012 (KR) .......................... 10-2012-0098447

(51) Int. Cl.
*H02P 6/06*    (2006.01)

(52) U.S. Cl.
CPC .......................................... *H02P 6/06* (2013.01)
USPC .......................................... 318/484; 318/490

(58) Field of Classification Search
CPC ........................................................ H02P 6/16
USPC ......... 318/446, 449, 452, 478, 484, 490, 430, 318/431
See application file for complete search history.

(56) References Cited

U.S. PATENT DOCUMENTS

| 5,294,928 | A * | 3/1994 | Cooper et al. ................. 341/142 |
| 5,909,093 | A * | 6/1999 | van Dinteren et al. .......... 318/16 |
| 6,404,157 | B1 * | 6/2002 | Simon ........................... 318/445 |
| 2007/0035896 | A1 | 2/2007 | Kobayashi et al. |

FOREIGN PATENT DOCUMENTS

JP         2012-055161 A         3/2012

OTHER PUBLICATIONS

Japanese Office Action with Full English Translation issued in Japanese Patent Application No. 2012-248250 mailed Oct. 22, 2013.

* cited by examiner

*Primary Examiner* — Bentsu Ro
(74) *Attorney, Agent, or Firm* — McDermott Will & Emery LLP

(57) ABSTRACT

There are provided a motor driving device and a method of controlling the same. The motor driving device includes a controlling unit; a plurality of unit circuits provided within the controlling unit and controlling driving of a motor; and a time slice controller provided within the controlling unit and periodically generating a wake-up signal, wherein some unit circuits among the plurality of unit circuits are operated for a certain operation time upon receiving the wake-up signal, thereby allowing for effective power consumption of the motor.

9 Claims, 3 Drawing Sheets

MOTOR DRIVING DEVICE AND METHOD OF CONTROLLING THE SAME

CROSS-REFERENCE TO RELATED APPLICATIONS

This application claims the priority of Korean Patent Application No. 10-2012-0098447 filed on Sep. 5, 2012, in the Korean Intellectual Property Office, the disclosure of which is incorporated herein by reference.

BACKGROUND OF THE INVENTION

1. Field of the Invention

The present invention relates to a motor driving device and a method of controlling the same.

2. Description of the Related Art

Recently, electric devices or electronic devices have been increasingly used domestically, commercially and industrially due to high demand therefore. Such devices may employ a driving circuit for driving a particular operation. For example, a motor may be used therein.

In general, a brushless direct contact (BLDC) motor refers to a DC motor having a function of applying a current or adjusting a current direction by using a contactless position detector and a semiconductor device without using a mechanical contact unit such as a brush, a commutator, or the like.

A BLDC motor is driven such that a current is applied in two phases among three phases to drive a switch, while one phase is open, according to a position of a rotor of a permanent magnet by using an inverter circuit. To this end, in the BLDC motor, a phase current of the motor should be changed according to a position of the rotor, so a rotor position detection sensor such as a hall sensor, an encoder, or the like, is required. Also, research into the development of a sensorless drive or driving a BLDC motor without a position sensor such as the hall sensor, the encoder, or the like, has been actively conducted.

A BLDC motor includes an electronic commutating unit installed instead of a brush and a commutator of a DC motor, providing advantages such as high efficiency, compactness, and the like, and therefore, it is used in various fields such as an ultra-book, a low-voltage fan, and the like. In particular, a motor driver IC driving current tends to be lowered for an ultra-book or a low-voltage fan. For example, in the case of a 5V fan motor, current consumption characteristics of about 1.3 mA are required, excluding a driving current. In the case of motor driving, since all circuits are constantly operated, a current is to be constantly applied, thus being ineffective in terms of power.

RELATED ART DOCUMENT (Patent Document 1) Japanese Patent Laid-Open Publication No. 2012-55161

SUMMARY OF THE INVENTION

An aspect of the present invention provides a motor driving device driven with low power at a low current by constantly operating some of a plurality of unit circuits included in a controlling unit and operating remaining unit circuits among the plurality of unit circuits during a certain operation time upon receiving a wake-up signal, and a method of controlling the same.

According to an aspect of the present invention, there is provided a motor driving device including: a controlling unit; a plurality of unit circuits provided within the controlling unit and controlling driving of a motor; and a time slice controller provided within the controlling unit and periodically generating a wake-up signal, wherein some unit circuits among the plurality of unit circuits are operated for a certain operation time upon receiving the wake-up signal.

The some unit circuits among the plurality of unit circuits operated upon receiving the wake-up signal may be in a sleep state, excluding the certain operation time.

The plurality of unit circuits may include: a first signal detection circuit part detecting a signal of a rotor position detection sensor; a sampling circuit part sampling the detected signal by using a frequency of an internal clock signal of the controlling unit; and a calculating circuit part calculating a rotation speed of the motor based on a sampling result from the sampling circuit part, wherein the wake-up signal may be generated at an initiation point and a termination point of a rotation period of the motor.

The operation time may be set in proportion to the rotation period of the motor.

The plurality of unit circuits may include a second signal detection circuit part detecting a duty ratio of an external input pulse-width-modulation (PWM) signal, and at least one of the first signal detection circuit part, the sampling circuit part, the calculating circuit part, and the second signal detection circuit part may be operated upon receiving the wake-up signal.

A duration for which the sleep state is maintained may be longer than the operation time.

According to another aspect of the present invention, there is provided a method of controlling a motor driving device, including: detecting a rotation period of a motor; setting an operation time in proportion to the detected rotation period of the motor, and periodically generating a wake-up signal; and applying the wake-up signal to some unit circuits in a sleep state, among a plurality of unit circuits included in a controlling unit, to operate the some unit circuits during the operation time.

The wake-up signal may be generated at an initiation point and a termination point of the rotation period of the motor.

The detecting of the rotation period of the motor may be performed by sampling a signal of a rotor position detection sensor.

In the rotation period of the motor, a duration for which the sleep state is maintained may be longer than the operation time.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

Hereinafter, a motor driving device and a method of controlling the same according to an embodiment of the present invention will be described. In particular, a motor having a hall sensor will be described for convenience of explanation, but the present invention is not limited thereto. The present invention may be applied to a motor having an optical sensor other than a hall sensor, a sensorless motor operated by a counter electromotive force (Back emf) signal.

Figure 1:
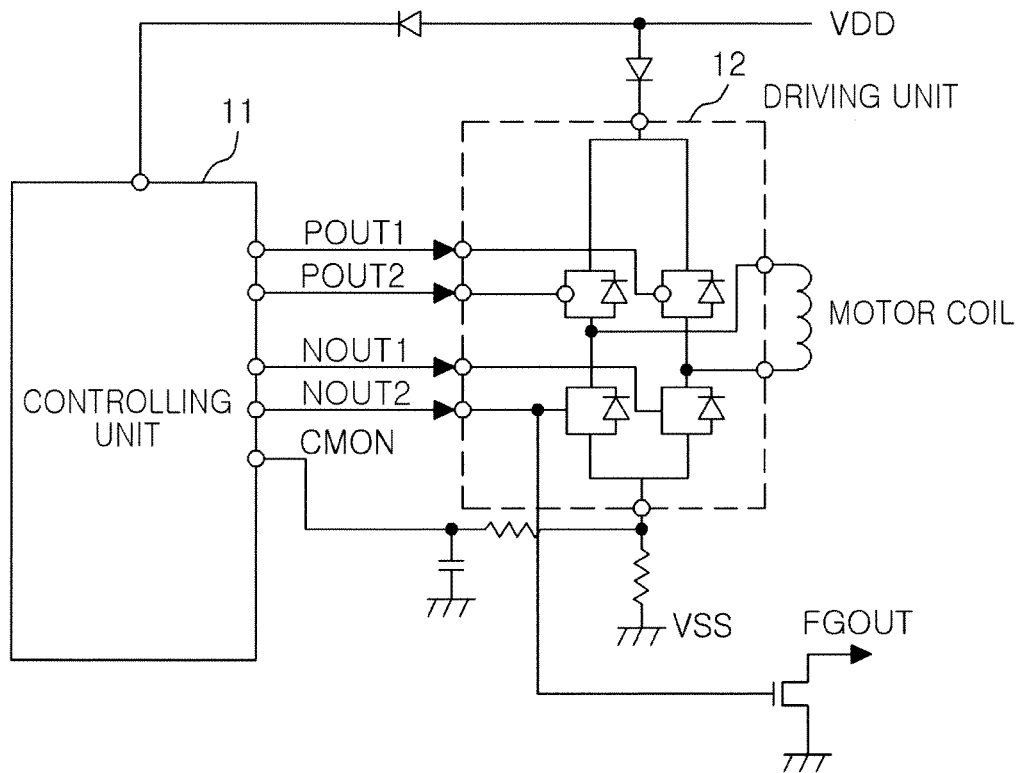
FIG. 1 is a view illustrating a configuration of a general motor driving device.

FIG. 1 is a view illustrating a configuration of a general motor driving device.

Referring to FIG. 1, a motor driving device 10 may include a controlling unit 11 and a driving unit 12. The controlling unit 11, including a motor control circuit unit, may receive a position detection signal output from the driving unit 12 and output motor control signals POUT1, POUT2, NOUT1, and NOUT2 for driving a motor. The controlling unit 11 includes a plurality of unit circuits having different functions. Each unit circuit will be described in detail with reference to FIG. 3 later.

The driving unit 12 may include a total of four switches, and the four switches may include two P-channel metal oxide semiconductor field-effect transistors (PMOS FETs) and two N-channel metal oxide semiconductor field-effect transistors (NMOS FETs).

A first PMOS FET, to which the motor control signal POUT1 is supplied, may be electrically connected between a power supply terminal supplying power and a ground, and a first NMOS FET, to which the motor control signal NOUT1 is supplied, may be electrically connected between the first PMOS FET and the ground.

A second PMOS FET, to which the motor control signal POUT2 is supplied, may be electrically connected between the power supply terminal and the ground while being connected in parallel to the first PMOS FET, and a second NMOS FET, to which the motor control signal NOUT2 is supplied, may be electrically connected between the second PMOS FET and the ground.

Upon receiving the motor control signals POUT1, POUT2, NOUT1, and NOUT2 from the controlling unit 11, the driving unit 12 may drive the motor by turning on or turning off the four FETs. In order to turn on or turn off the four FETs, the four motor control signals POUT1, POUT2, NOUT1, and NOUT2 are required.

Figure 2:
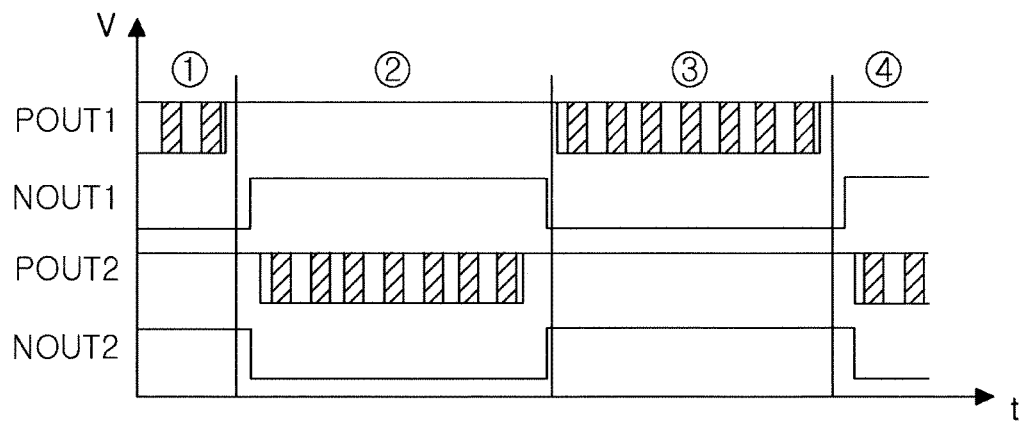
FIG. 2 is a graph showing driving signals of the motor driving device.

FIG. 2 illustrates driving signals of the motor driving device.

Referring to FIG. 2, driving signals transferred from the controlling unit 11 to the driving unit 12 may be classified into four types of signals, and the driving signals may be transferred in order of identification numbers ①, ②, ③, and ④.

Namely, by the driving signal of the identification number ①, the first PMOS FET (P1) and the second NMOS FET (N2) may be turned on, and by the driving signal of the identification number ②, the first PMOS FET (P1) and the second NMOS FET (N2) may be turned off and the second PMOS FET (P2) and the first NMOS FET (N1) may be turned on.

Also, by the driving signal of the identification number ③, the second PMOS FET (P2) and the first NMOS FET (N1) may be turned off and the first PMOS FET (P1) and the second NMOS FET (N2) may be turned on, and by the driving signal of the identification number ④, the first PMOS FET (P1) and the second NMOS FET (N2) may be turned off and the second PMOS FET (P2) and the first NMOS FET (N1) may be turned on.

According to such a driving scheme, a speed of the motor may be adjusted by generating a PWM signal (portions indicated by deviant crease lines in FIG. 2), when the first PMOS FET (P1) and the second PMOS FET (P2) are turned on.

In order to accurately drive the motor, a controlling operation of the motor driving device is performed as follows. Namely, a current flowing in the motor is detected through a resistor connected to a ground, and a PWM signal is provided based on the detected signal, to thus appropriately adjust a speed of the motor. In the case of an overcurrent, the driving of the motor may be stopped.

Figure 3:
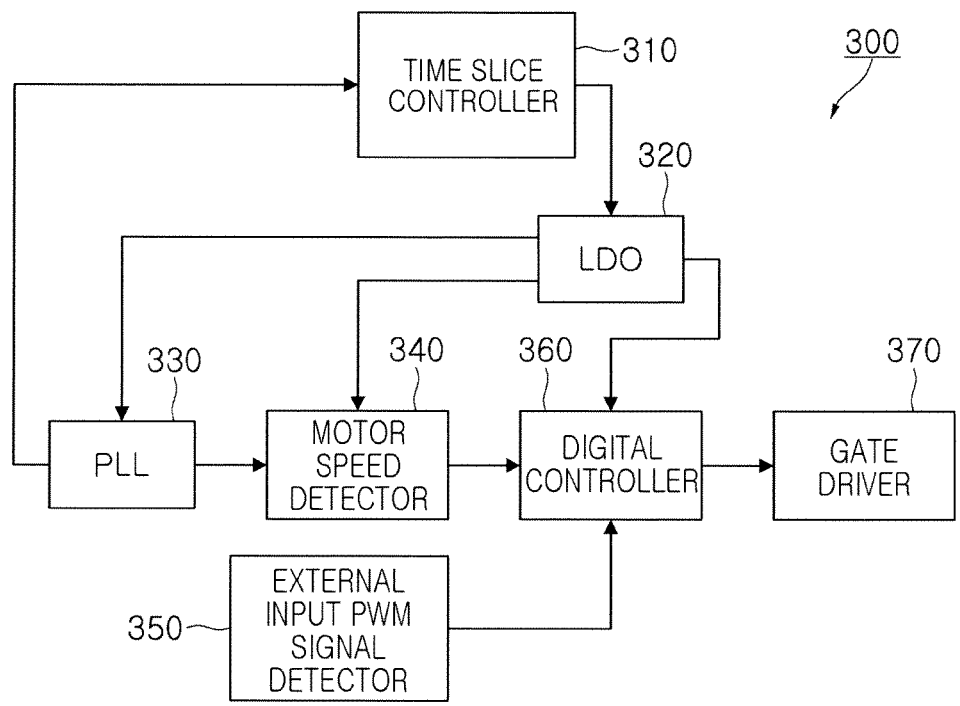
FIG. 3 is a schematic block diagram of a controlling unit of the motor driving device according to an embodiment of the present invention.

FIG. 3 is a schematic block diagram of a controlling unit of a motor driving device according to an embodiment of the present invention.

Referring to FIG. 3, the controlling unit of the motor driving device according to the present embodiment includes a plurality of unit circuits for controlling the driving of the motor by performing different functions. The plurality of unit circuits may include a time slice controller 310, a low dropout regulator (LDO) 320, a phase locked loop (PLL) 330, a motor speed detector 340, a digital controller 360, an external input pulse-width-modulation (PWM) signal detector 350, and a gate driver 370.

The LDO 320, a voltage divider, converts a voltage into a voltage having a voltage level determined in each unit circuit and outputs the same, so that each unit circuit may stably operate. The PLL 330 is a circuit configured to uniformly maintain a frequency of an output signal all the time. The PLL 330 may repeatedly output a clock signal. A clock signal output from the PLL 330 is input to the motor speed detector 340 and the time slice controller 310.

The motor speed detector 340 may include a signal detection circuit part, a sampling circuit part, and a calculating circuit part.

The signal detection circuit part may detect a signal having a variable level changing according to a position of a rotor from a rotor position detection sensor. The signal detected by the signal detection circuit part is sampled using a clock signal in the sampling circuit part. The calculating circuit part may calculate a rotation speed or a rotation period of the motor by counting the number of times of sampling based on the sampled signal. As the number of times of sampling is increased, the rotation speed of the motor is fast, and as the number of times of sampling is reduced, the rotation speed of the motor is slow.

The external input PWM signal detector 350 detects a signal generated outside the motor driving device in order to change the rotation speed of the motor, and the signal may be an input PWM signal. The external input PWM signal detector 350 may sample the input PWM signal and count the number of times of sampling to generate a duty ratio. Namely, the duty ratio may be measured as a ratio of time in which a high level is maintained during a single period of the input PWM signal. In the case of increasing the rotation speed of the motor, the duty ratio may be increased, and in the case of decreasing the rotation speed of the motor, the duty ratio may be decreased, thus controlling the speed of the motor.

The digital controller 360 applies a control signal to the gate driver 370. The digital controller 360 may generate a control signal by comparing the rotation speed of the motor detected by the motor speed detector 340 and the duty ratio of the external input PWM signal detected by the external input PWM signal detector 350.

Namely, when the rotation speed of the motor is less than the external input PWM signal, the digital controller 360 generates a control signal for increasing the rotation speed of the motor, and when the rotation speed of the motor is greater than the external input PWM signal, the digital controller 360 generates a control signal for decreasing the rotation speed of the motor. The gate driver 370 may provide driving signals for driving the plurality of FETs according to the control signal from the digital controller 360.

The time slice controller 310 may generate a wake-up signal. The wake-up signal may enable a sleep-state circuit or block to operate, and after the lapse of a certain amount of time, the circuit or block may be returned to the sleep state. According to the embodiment of the present invention, among the plurality of unit circuits 310 to 370, unit circuits, other than the unit circuits which are to be essentially operated together at the time of driving the motor, may be selectively operated.

For example, at the time of driving the motor, unit circuits, excluding the LDO 320, the PLL 330, the gate driver 370, and the time slice controller 310 which are to be essentially operated all the time in driving the motor, may operate for a certain operation time when a wake-up signal is received in a sleep state, and when the operation time has lapsed, the unit circuits may be returned to the sleep state.

According to the embodiment of the present invention, since some unit circuits among the plurality of unit circuits constituting the controlling unit are only operated for a certain period of time when receiving a wake-up signal in a sleep state, rather than being constantly operated, unnecessary power consumption can be reduced.

Figure 4A:
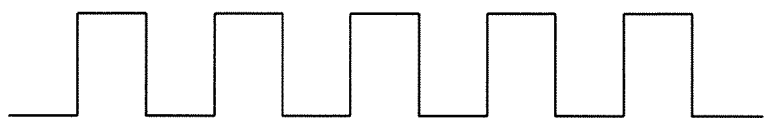
FIG. 4A through 4C are views illustrating a wake-up signal according to an embodiment of the present invention.
Figure 4B:
Figure 4C:
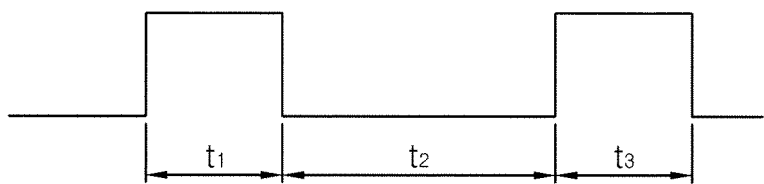

FIGS. 4A through 4C are views illustrating a wake-up signal according to an embodiment of the present invention.

FIG. 4A is a pulse representing a main internal clock output by the PLL 330 of FIG. 3, FIG. 4B is a pulse representing a rotation period of the motor detected by the motor speed detector 340 of FIG. 3, and FIG. 4C is a pulse representing a period of the wake-up signal.

Referring to FIGS. 4A through 4C, upon receiving the wake-up signal, some unit circuits among the plurality of unit circuits are operated for a certain operation time t1, starting from a motor rotation period, and after the operation time t1 has lapsed, the unit circuits are in a sleep state for a time t2, and thereafter, the unit circuits are operated for a certain operation time t3. In the motor rotation period, the operation time, namely, the time obtained by adding t1 and t3 is shorter than the time t2 during which the unit circuits are maintained in the sleep state, and since some unit circuits are not driven for the time t2, the motor can be driven with low power at a low current.

Also, the rotation period of the motor may be changed according to the external input PWM signal, so the operation time may be set in proportion to the rotation period of the motor. For example, 70% to 80% of the rotation period of the motor may be set to be in a sleep state, and the operation time may be increased as the rotation period of the motor is increased, and may be shortened as the rotation period of the motor is shortened.

Figure 5:
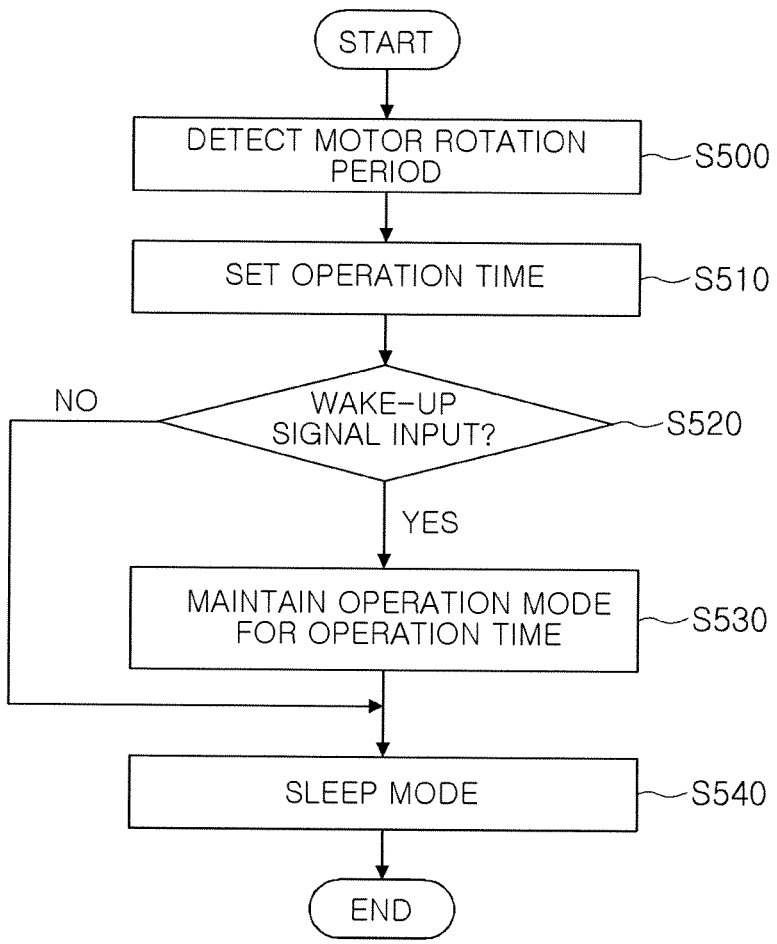
FIG. 5 is a flowchart illustrating a method of operating circuits in a controlling unit of a motor driving device according to an embodiment of the present invention.

FIG. 5 is a flowchart illustrating a method of operating circuits in a controlling unit of a motor driving device according to an embodiment of the present invention.

Referring to FIG. 5, the operation of unit circuits included in the controlling unit of the motor driving device according to the embodiment of the present invention starts with detecting a rotation period of the motor (S500). The rotation period of the motor may be calculated by sampling a signal generated from the rotor position detection sensor of the rotor and subsequently counting the number of times of sampling of the sampled signal.

An operation time of the unit circuits that receives a wake-up signal according to the rotation period of the motor may be set (S510). The operation time may be set in proportion to the rotation period of the motor, and here, the operation time may be increased as the rotation period of the motor is increased, and is shortened as the rotation period of the motor is shortened.

When some unit circuits among the plurality of unit circuits receive the wake-up signal, some unit circuits in a sleep state may be maintained in an operation mode for a certain operation time (S530).

The unit circuits are operated upon receiving the wake-up signal at an initiation point of the rotation period of the motor, and when the certain operation time has lapsed, the unit circuits may be changed into the sleep mode (S540). Thus, since some unit circuits among the plurality of unit circuits constituting the controlling unit of the motor are only operated for a certain period of time, unnecessary power consumption can be reduced and the motor can be driven at a low current.

The unit circuits in the sleep mode may be changed into the operation mode upon receiving the wake-up signal at a termination point of the rotation period of the motor. Namely, the unit circuits may be operated at the initiation point and the termination point of the rotation period of the motor upon receiving the wake-up signal, and while the motor is being driven, the operation mode and the sleep mode of the unit circuits may be periodically repeated.

As set forth above, according to embodiments of the invention, in a motor driving device and a method of controlling the same, some unit circuits, among a plurality of unit circuits included in a controlling unit, are constantly operated, while the remaining unit circuits are operated for a certain operation time upon receiving a wake-up signal, whereby a motor can be driven with low power and at a low current.

While the present invention has been shown and described in connection with the embodiments, it will be apparent to those skilled in the art that modifications and variations can be made without departing from the spirit and scope of the invention as defined by the appended claims.

What is claimed is:
1. A motor driving device, comprising:
 a controlling unit;
 a plurality of unit circuits provided within the controlling unit and configured to control driving of a motor and detect a rotation period of the motor; and
 a time slice controller provided within the controlling unit and configured to periodically generate a wake-up signal,
 wherein some unit circuits among the plurality of unit circuits are operated for a certain operation time set in proportion to the detected rotation period of the motor upon receiving the wake-up signal.

2. The motor driving device of claim 1, wherein the unit circuits among the plurality of unit circuits operated upon receiving the wake-up signal are in a sleep state, excluding the certain operation time.

3. The motor driving device of claim 2, wherein a duration for which the sleep state is maintained is longer than the operation time.

4. The motor driving device of claim 1, wherein the plurality of unit circuits include:
- a first signal detection circuit part detecting a signal of a rotor position detection sensor;
- a sampling circuit part sampling the detected signal by using a frequency of an internal clock signal of the controlling unit; and
- a calculating circuit part calculating a rotation speed of the motor based on a sampling result from the sampling circuit part, wherein the wake-up signal is generated at an initiation point and a termination point of the detected rotation period of the motor.

5. The motor driving device of claim 4, wherein the plurality of unit circuits include a second signal detection circuit part detecting a duty ratio of an external input pulse-width-modulation (PWM) signal, and at least one of the first signal detection circuit part, the sampling circuit part, the calculating circuit part, and the second signal detection circuit part is operated upon receiving the wake-up signal.

6. A method of controlling a motor driving device, the method comprising:
- detecting a rotation period of a motor;
- setting an operation time in proportion to the detected rotation period of the motor, and periodically generating a wake-up signal; and
- applying the wake-up signal to some unit circuits in a sleep state, among a plurality of unit circuits included in a controlling unit, to operate the some unit circuits during the operation time.

7. The method of claim 6, wherein the wake-up signal is generated at an initiation point and a termination point of the rotation period of the motor.

8. The method of claim 6, wherein the detecting of the rotation period of the motor is performed by sampling a signal of a rotor position detection sensor.

9. The method of claim 6, wherein, in the rotation period of the motor, a duration for which the sleep state is maintained is longer than the operation time.

* * * * *